United States Patent
Shin et al.

(10) Patent No.: US 11,143,584 B2
(45) Date of Patent: Oct. 12, 2021

(54) SELECTIVE FUNCTIONALIZATION OF SENSING SURFACE

(71) Applicant: International Business Machines Corporation, Armonk, NY (US)

(72) Inventors: SangHoon Shin, Folsom, CA (US); Sufi Zafar, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 332 days.

(21) Appl. No.: 16/149,842

(22) Filed: Oct. 2, 2018

(65) Prior Publication Data
US 2020/0103332 A1 Apr. 2, 2020

(51) Int. Cl.
*G01N 15/06* (2006.01)
*G01N 15/00* (2006.01)

(52) U.S. Cl.
CPC ..... *G01N 15/0656* (2013.01); *G01N 15/0606* (2013.01); *G01N 2015/0065* (2013.01)

(58) Field of Classification Search
CPC ........... G01N 15/0656; G01N 15/0606; G01N 2015/0065
See application file for complete search history.

(56) References Cited

U.S. PATENT DOCUMENTS

| | | | |
|---|---|---|---|
| 8,314,357 B2 | 11/2012 | Kuypers | |
| 8,389,325 B2 | 3/2013 | Carella et al. | |
| 9,645,135 B2 | 5/2017 | Shin et al. | |
| 9,821,321 B2 | 11/2017 | Fischer | |
| 2004/0195563 A1 | 10/2004 | Bao | |
| 2010/0216256 A1 | 8/2010 | Cheng et al. | |
| 2010/0260745 A1 | 10/2010 | Zhou | |
| 2013/0225416 A1 | 8/2013 | Altmann et al. | |
| 2014/0054651 A1 | 2/2014 | Bashir et al. | |
| 2020/0102218 A1 | 4/2020 | Shin et al. | |

FOREIGN PATENT DOCUMENTS

WO 2004034025 A2 4/2004

OTHER PUBLICATIONS

Zafar, Sufi, and Tak Ning. "Bipolar junction transistor based sensors for chemical and biological sensing." 2016 46th European Solid-State Device Research Conference (ESSDERC). IEEE, 2016. (Year: 2016).*

(Continued)

*Primary Examiner* — Robert J Eom
(74) *Attorney, Agent, or Firm* — Cantor Colburn LLP; Anthony Curro

(57) ABSTRACT

A structure for sensing a molecule in a solution is provided. The structure includes a transducer, a sensing surface and a heating element. With the sensing surface immersed in a first solution, a heating of the sensing surface by the heating element disassembles first self-assembled molecules from the sensing surface. With the sensing surface immersed in a second solution, second molecules self-assemble onto the sensing surface. The transducer is configured to cooperatively monitor molecular disassembly and self-assembly in the first and second solutions, respectively, with respect to the sensing surface.

5 Claims, 7 Drawing Sheets

(56) References Cited

OTHER PUBLICATIONS

Gu, Changzhi, et al. "The design and characteristics of a porphyrin LB film ChemFET gas sensor." Thin Solid Films 284 (1996): 863-865. (Year: 1996).*
Khan Academy "Protein structure: Primary, secondary, tertiary & quaternary" available at: URL: https://www.khanacademy.org/science/biology/macromolecules/proteins-and-amino-acids/a/orders-of-protein-structure (Year 2020), 21 pgs.
Elibol et al., "Localized Heating on Silicon Field Effect Transistors: Device Fabrication and Temperature Measurements in Fluid", Lab Chip. Oct. 7, 2009; 9(19),pp. 2789-2795.
Jin et al., "Using nanoscale thermocapillary flows to create arrays of purely semiconducting single-walled carbon nanotubes", Articles, Published Online: Apr. 28, 2013, vol. 8, pp. 347-355.
Mu et al., "Silicon Nanowire Field-Effect Transistors—A Versatile Class of Potentiometric Nanobiosensors", IEEE Access, vol. 3, 2015, pp. 287-302.
Park et al., "Selective Surface Functionalization of Silicon Nanowires via Nanoscale Joule Heating", Nano Letters, 2007, vol. 7, No. 10, pp. 3106-3111.
Reddy Jr. et al., "Silicon Field Effect Transistors as Dual-Use Sensor-Heater Hybrids", Anal Chem. Feb. 1, 2011; 83(3), pp. 888-895.
List of IBM Patents or Patent Applications Treated as Related; (Appendix P), Filed Oct. 2, 2018; 2 pages.

\* cited by examiner

SELECTIVE FUNCTIONALIZATION OF SENSING SURFACE

BACKGROUND

The present invention generally relates to nanowire sensors. More specifically, the present invention relates to selective functionalization of a sensing surface.

Nano-wire sensors are sensors whose active element widths are characterized in that they are of nanometer length scale. Nanowire sensors can be made in several ways including, but not limited to, top-down lithography, bottom-up assembly and molecular self-assembly.

Nanowire sensors have several benefits in sensitivity and specificity over sensors made from traditional materials. Nanowire sensors can have increased sensitivity and resolution because they operate at a similar scale as natural biological processes, allowing functionalization with chemical and biological molecules through recognition events that cause detectable physical changes. Enhancements in sensitivity stem from high surface-to-volume ratio of nanomaterials, as well as novel physical properties of nanomaterials that can be used as the basis for detection, including nanophotonics. Nanowire sensors can also potentially be integrated with nanoelectronics to add native processing capability.

For example, one-dimensional nanomaterials such as nanowires and nanotubes are often well suited for use in nanowire sensors, as compared to bulk or thin-film planar devices. These materials can function both as transducers and wires to transmit signals. The relatively high surface area of these materials can cause large signal changes upon the binding of an analyte while their relatively small size can enable extensive multiplexing of individually addressable sensor units in a small device.

SUMMARY

Embodiments of the present invention are directed to a structure for sensing molecules in a solution is provided. A non-limiting embodiment of the structure includes a transducer, a sensing surface and a heating element. With the sensing surface immersed in a first solution, a heating of the sensing surface disassembles first self-assembled molecules from the sensing surface. With the sensing surface immersed in a second solution, second molecules self-assemble onto the sensing surface. The transducer is configured to cooperatively monitor molecular disassembly and self-assembly in the first and second solutions, respectively, with respect to the sensing surface.

Embodiments of the present invention are directed to a method for sensing molecules in a solution. A non-limiting embodiment of the method includes immersing the sensing surface in a first solution, heating the sensing surface in the first solution to disassemble first self-assembled molecules from the sensing surface, immersing the sensing surface in a second solution whereby second molecules self-assemble onto the sensing surface and monitoring, at a bi-polar junction transistor (BJT) transducer, molecular disassembly and self-assembly in the first and second solutions, respectively, with respect to the sensing surface.

Embodiments of the invention are directed to a method for sensing molecules in a solution. A non-limiting embodiment of the method includes immersing the sensing surface in a first solution, heating the sensing surface in the first solution to disassemble first self-assembled molecules from the sensing surface, immersing the sensing surface in a second solution whereby second molecules self-assemble onto the sensing surface and monitoring, at a field effect transistor (FET) transducer, molecular disassembly and self-assembly in the first and second solutions, respectively, with respect to the sensing surface.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
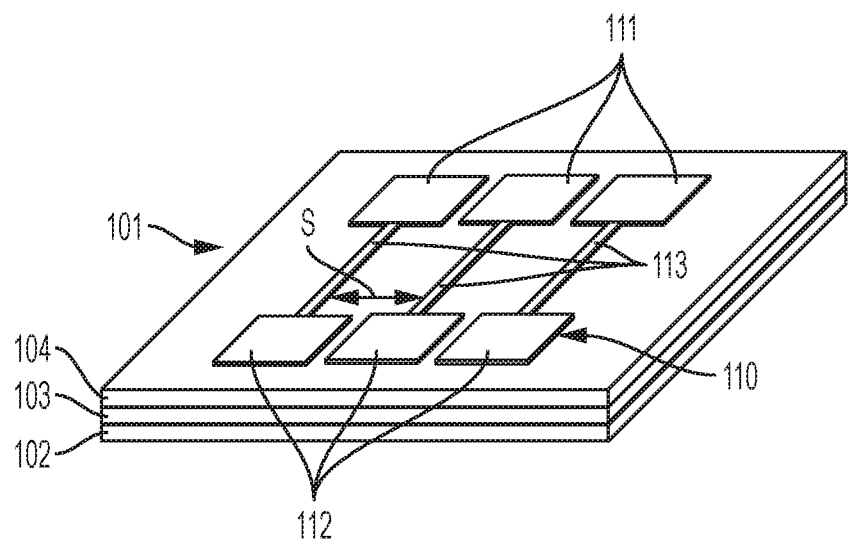
FIG. 1 is a perspective view of a wafer having FETs formed thereon in accordance with embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to semiconductor device, integrated circuit (IC) and nanowire sensor fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices, semiconductor-based ICs and nanowire sensors are well known and so, in the interest of brevity, many conventional steps will only be mentioned briefly herein or will be omitted entirely without providing the well-known process details.

Turning now to an overview of technologies that are more specifically relevant to aspects of the invention, analyte detection systems often have to be able to detect several analytes (proteins, ions, viruses etc.) in a small volume. This small volume could be nanometer scale. Therefore, detection systems need to include sensors whose smallest spatial resolution for functionalization is similarly on the nanometer scale. Currently, however, the smallest spatial resolution for sensor functionalization is around 1 micron.

Turning now to an overview of the aspects of the invention, one or more embodiments of the invention address the above-described shortcomings of the prior art by providing a selective functionalization method as well as a structure for sensing a molecule in a solution. A non-limiting example of the method includes self-assembling first molecules to nanowires of transistors provided on a wafer. A transistor is identified as a target transistor and transistors neighboring the target transistor are identified as neighboring transistors. The first molecules are disassembled from the nanowire of the target transistor without disassembling the first molecule from the nanowires of the neighboring transistors. The second molecules are self-assembled to the nanowire of the target transistor.

A non-limiting example of the structure includes a transducer, a sensing surface, circuitry electrically coupled with the transducer and configured to heat the sensing surface and a container in which the sensing surface is immersible in at least first and second solutions. With the sensing surface immersed in the first solution, a heating of the sensing surface by the circuitry is sufficient to disassemble first self-assembled molecules from the sensing surface. With the sensing surface immersed in the second solution, second molecules self-assemble onto the sensing surface. The transducer and the circuitry are further configured to cooperatively monitor molecular disassembly and self-assembly in the first and second solutions, respectively, with respect to the sensing surface.

The above-described aspects of the invention address the shortcomings of the prior art in that they present a method for selective functionalization as well as a structure for sensing molecules in a solution. In particular, specific bipolar junction transistor (BJT) and field effect transistor (FET) structures are proposed in which collector or drain current heating is sufficient to selectively remove self-assembled molecules and thus achieve selective functionalization. The resulting nanowire sensors can have differently functionalized sensing surfaces and thus enable the detection of multiple analytes from a small sample volume. In some cases, the nanowire sensors can be provided as quasi-one dimensional nanowire BJT or FET sensors that have a unique ability to detect analytes at low concentrations and that can also be fabricated in close packed arrays.

Turning now to a more detailed description of aspects of the present invention, FIG. 1, is an illustration of wafer 101 that is assembled according to embodiments of the present invention. The wafer 101 can include a substrate 102, such as a silicon substrate, a buried oxide (BOX) layer 103 and a semiconductor layer 104 in a silicon-on-insulator (SOI) configuration. As shown in FIG. 1, the wafer 101 further includes transistors, such as field effect transistors (FETs) 110 that are arrayed on the semiconductor layer 104. The FETs 110 each include a source 111, a drain 112 and a nanowire 113 extending between the source 111 and the drain 112. The FETs 110 may be arranged in a side-by-side formation in which the sources 111 are generally aligned with each other, the drains 112 are generally aligned with each other and the nanowires 113 are generally aligned with each other. The wafer 101 can also include bi-polar transistors (BJTs) arrayed in a similar manner as the FETs 110.

Each source 111, each drain 112 and each nanowire 113 can include a semiconductor material, such as silicon or another similar material. The following description will relate to the case in which at least the nanowires 113 are formed of silicon. This is done for clarity and brevity and is not intended to otherwise limit the scope of the application.

Figures 2, 3:
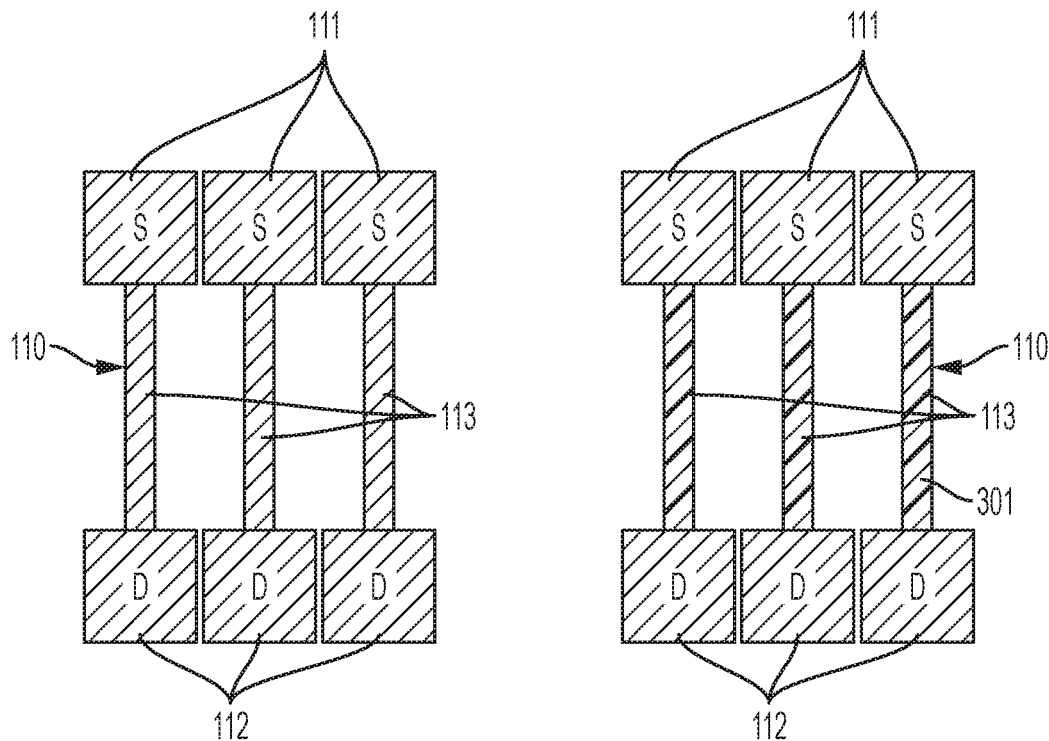
FIG. 2 is a top down view of FETs prior to a self-assembly process being executed in accordance with embodiments of the present invention.
FIG. 3 is a top down view of FETs following a self-assembly process being executed in accordance with embodiments of the present invention.

FIG. 2 depicts a top-down cross-sectional view of the FETs 110 prior to a fabrication operation in accordance with aspects of the invention, and FIG. 3 depicts the FETs 110 just after the fabrication operation. In embodiments of the invention, the fabrication operations include, once the wafer 101 is assembled, immersing the wafer 101 in a first solution. The first solution may include a water- or alcohol-based solvent and a first molecule 301 that is dissolved in the solvent. The first molecule 301 has an affinity towards binding with the silicon of the nanowires 113 of the FETs 110 of the wafer 101. The wafer 101 remains immersed in the solvent until self-assembly of the first molecule 301 onto the nanowires 113 is complete, which is depicted in FIG. 3.

Figure 4:
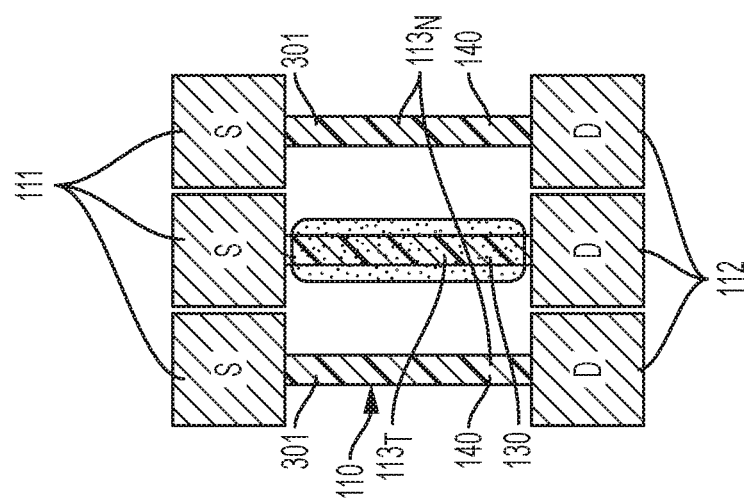
FIG. 4 is a top down view of the FETs of FIG. 3 with a target FET being heated in accordance with embodiments of the present invention.

With continued reference to FIG. 3 and with additional reference to FIG. 4, one or more of the FETs 110 is identified as a target transistor or target FET 130 and FETs 110 that neighbor the target FET 130 are identified as neighboring transistors or neighboring FETs 140. At this point, as shown in FIG. 4, the target FET 130 is heated to a temperature as which the first molecule 301 desorbs or disassembles from the corresponding nanowire $113_T$. The heating can be executed by an application of drain current to the target FET 130 and raises the temperature of only the target FET 130 to the minimum temperature at which the first molecule 301 disassembles from the nanowire $113_T$. Thus, the heating of the target FET 130 does not heat the neighboring FETs 140 to the minimum temperature for disassembly and does not result in the disassembly of the first molecule 301 from the nanowires $113_N$ of the neighboring FETs 140.

Figure 5:
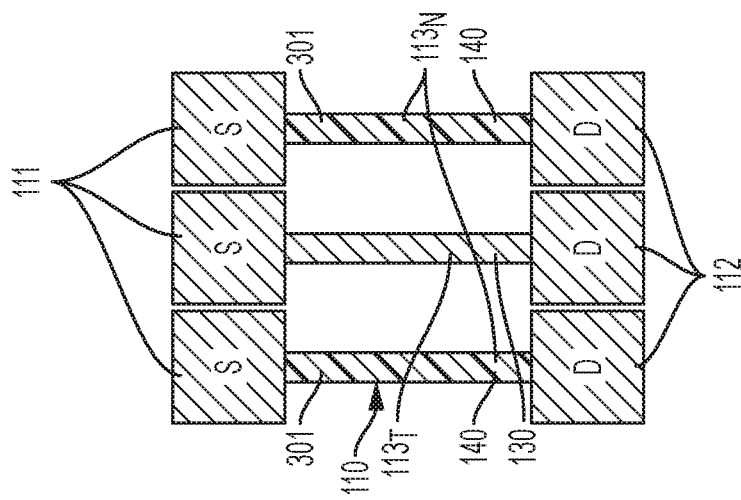
FIG. 5 is a top down view of the FETs of FIG. 4 with the target FET having been heated to a disassembly temperature in accordance with embodiments of the present invention.

The target FET 130 following disassembly of the first molecule 301 from the nanowire $113_T$ and the neighboring FETs 140 at which disassembly of the first molecule 301 from the nanowires $113_N$ has not occurred are illustrated schematically in FIG. 5.

Following the disassembly of the first molecule 301 from the nanowire $113_T$ of the target FET 130, the wafer 101 is re-immersed in a second solution. The second solution may include a water- or alcohol-based solvent and a second molecule 601 that is dissolved in the solvent. The second molecule 601 has an affinity towards binding with the silicon of the nanowire $113_T$ of the target FET 130. The wafer 101 remains immersed in the solvent until self-assembly of the second molecule 601 onto the nanowire $113_T$ of the target FET 130 is complete.

Figure 6:
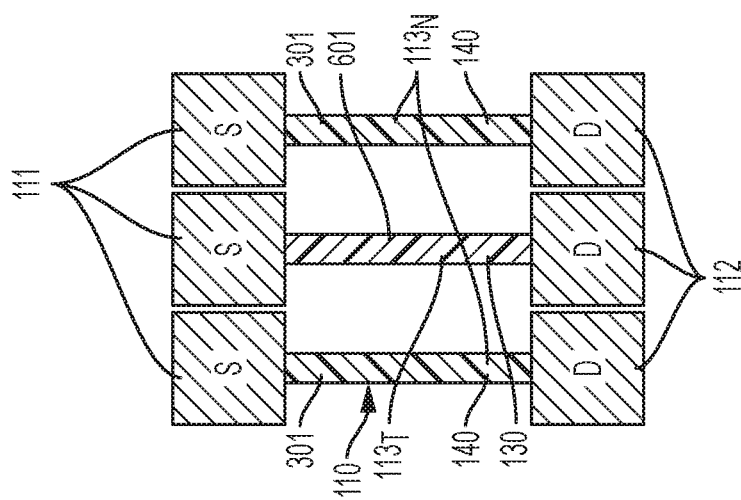
FIG. 6 is a top down view of the FETs of FIG. 5 following a self-assembly process being executed with respect to the target FET in accordance with embodiments of the present invention.

The target FET 130 following the self-assembly of the second molecule 601 to the nanowire $113_T$ and the neighboring FETs 140 at which disassembly of the first molecule 301 has not occurred are illustrated schematically in FIG. 6.

In accordance with embodiments of the present invention, the first and second molecules 301, 601 can include proteins, viruses, ions, etc. As such, where the nanowire $113_T$ of the target FET 130 has the second molecule 601 bound thereto while the nanowires $113_N$ of the neighboring FETs 140 have the first molecule 301 bound thereto, the functionalization of the target FET 130 is effectively differentiated from the functionalization of the neighboring FETs 140.

Figure 7:
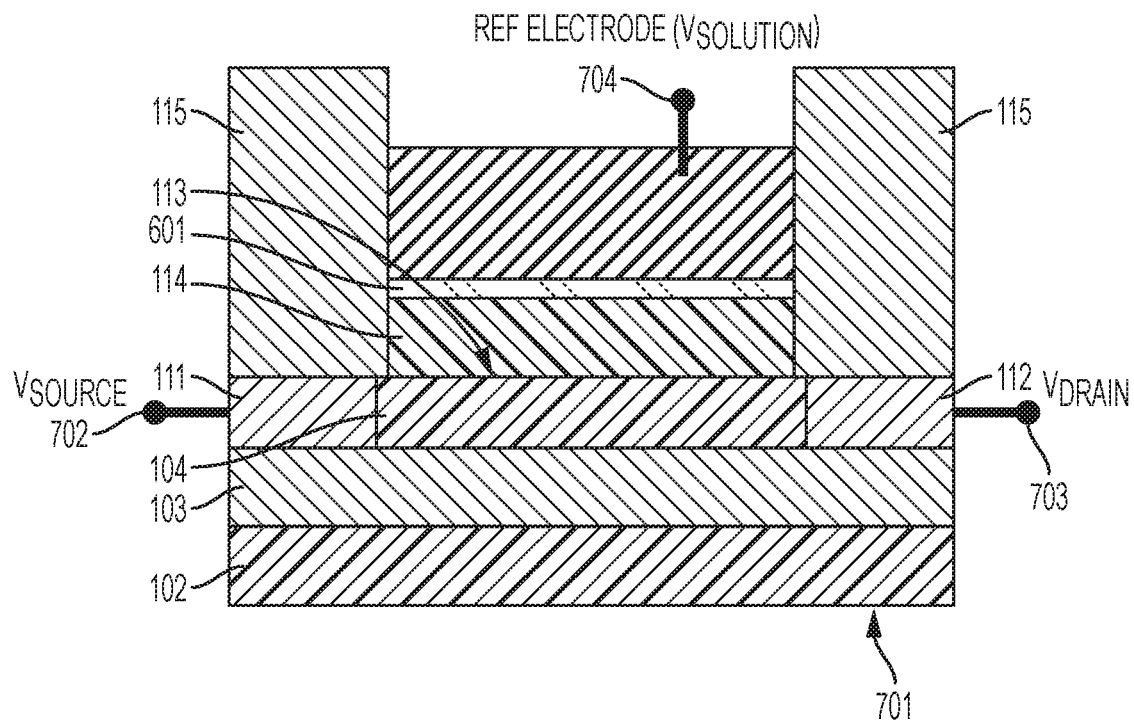
FIG. 7 is a schematic cross-sectional illustration of a nanowire FET sensors fabricated on a silicon-on-insulator (SOI) wafer in accordance with embodiments of the present invention.

With reference to FIG. 7, a result of the self-assembly processes described above can be the provision of an FET sensor 701. The FET sensor 701 is effectively fabricated on an SOI wafer and includes the substrate 102, the BOX layer 103 and the semiconductor layer 104. Within the semiconductor layer 104, a nanowire 113 extends between a source 111 and a drain 112 to form the channel of the FET sensor 701. The nanowire 113 is covered with an insulating film 114. The insulating film 114 can be formed of silicon dioxide or a combination of silicon dioxide and hafnium dioxide, for example. The insulating film 114 extends between spacers 115 and is in contact with the second solution whereby the second molecule 601 self-assembles on the insulating film 114. Electrical current can be supplied through the FET sensor 701 by way of leads 702 ($V_{source}$) and 703 ($V_{drain}$) with reference current for sensing applied to lead 704 ($V_{solution}$).

In accordance with other embodiments of the present invention, a result of the self-assembly process described above can also be the provision of a BJT sensor. Such a BJT sensor would be effectively fabricated on the SOI wafer and would include similar structures as described above.

Figure 8:
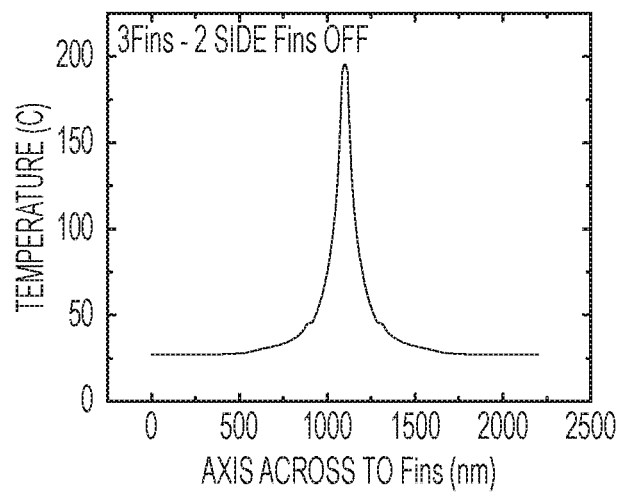
FIG. 8 is a graphical depiction of a temperature profile of a wafer during a disassembly heating process in accordance with embodiments of the present invention.

With reference to FIG. 8, the operation of heating the target FET 130 such that disassembly does not occur at the neighboring FETs 140 can be executed such that an increased temperature region is localized at the axis of the nanowire $113_T$ of the target FET 130. As shown in FIG. 8, in an event the temperature at which disassembly of the first molecule 301 occurs is around 150° C., the neighboring FETs 140 should be placed around 150 nm from the target FET 130. At this distance, the neighboring FETs 140 will be slightly heated by the heating of the target FET 130 but the heating will be insufficient to raise the temperature of the neighboring FETs 140 to the disassembly temperature.

In accordance with embodiments of the present invention, the original assembly of the wafer 101 can take into account the disassembly temperature as well as the localization of the heating of the target FET 130 in order to determine a placement of the neighboring FETs 140 relative to the target FET 130. That is, the assembling of the wafer 101 includes providing spacing S (see FIG. 1) between the target FET 130 and the neighboring FETs 140. The spacing S is sufficient to prevent the heating of the target FET 130 from heating the neighboring FETs 140 to the disassembly temperature even if the heating heats the neighboring FETs 140 to a temperature that is otherwise safely below the disassembly temperature.

The original assembly of the wafer 101 can also take into account dimensions of the target FET 130 and the neighboring FETs 140 in order to avoid the induced disassembly of the first molecule 301 from the nanowires $113_N$ of the neighboring FETs 140 and also to avoid degrading sensing characteristics of the resulting structures. As a general matter, optimized FET structures for a nanowire sensor exhibit enhanced sensing characteristics and the ability to withstand heating. The enhanced sensing characteristics can arise from relatively small surface areas of the target FET 130 and the neighboring FETs 140 and from an absence of short channel effects. On the other hand, the ability of the target FET 130 and the neighboring FETs 140 in particular to withstand heating can arise from these features having relatively large structures (e.g., a large fin height which promotes controlled heating but can prevent certain sensing capabilities).

Figure 9:
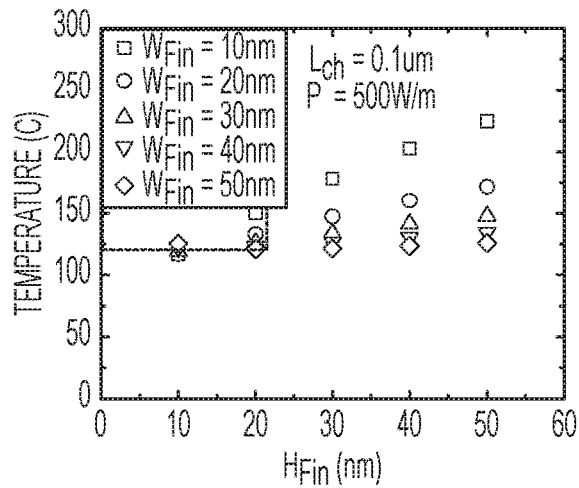
FIG. 9 is a graphical depiction of an optimization of fin height and width for various conditions in accordance with embodiments of the present invention.
Figure 10:
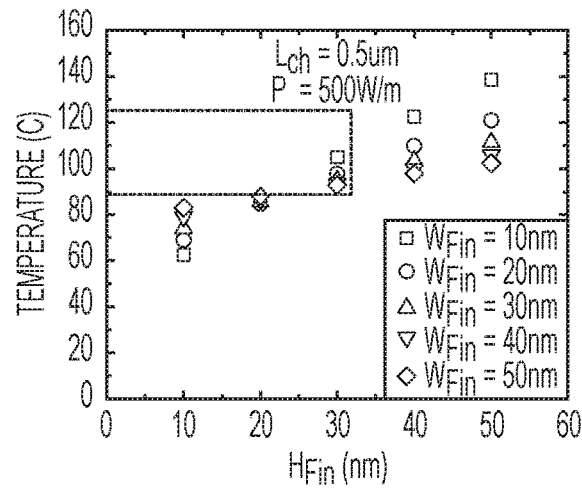
FIG. 10 is a graphical depiction of an optimization of fin height and width for various conditions in accordance with embodiments of the present invention.
Figure 11:
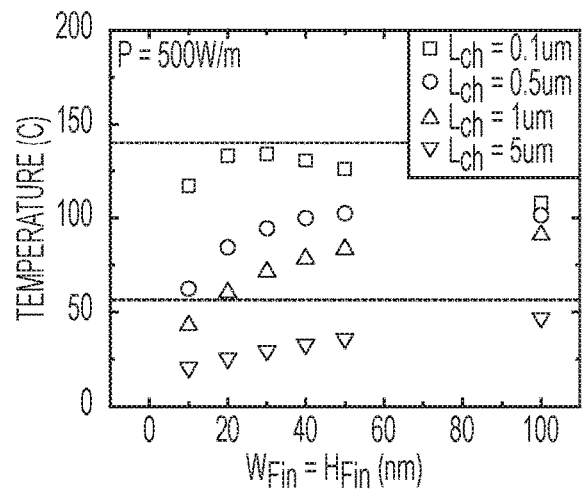
FIG. 11 is a graphical depiction of an optimization of fin height and width for various conditions in accordance with embodiments of the present invention.

With reference to FIGS. 9-11, graphical depictions of fin width and height optimizations are shown for various conditions. As shown in FIG. 9, if the disassembly temperature for disassembling the first molecule 301 from the nanowire 113T of the target FET 130 is about 150° C. and a channel length is about 0.1 µm, a height of the target FET 130 should be about 20 nm and a width of the target FET 130 should be about 20 nm. As shown in FIG. 10, if the disassembly temperature for disassembling the first molecule 301 from the nanowire 113T of the target FET 130 is about 100° C. and a channel length is about 0.5 µm, a height of the target FET 130 should be about 30 nm and a width of the target FET 130 should be about 30 nm. The graphics of FIG. 11 illustrate that optimized structures for various applications which are manufactural in existing fabrication lines, if the disassembly temperature for disassembling the first molecule 301 from the nanowire 113T of the target FET 130 is about 60-140° C. and a channel length is about 0.1-1 µm, a height of the target FET 130 should be about 20-40 nm and a width of the target FET 130 should be about 20-40 nm.

Figure 12:
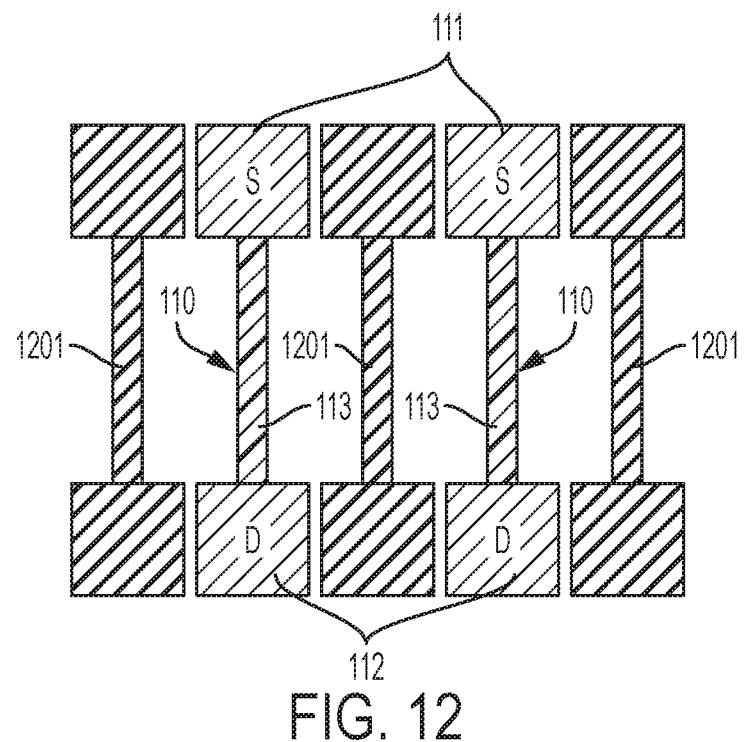
FIG. 12 is a top down view of FETs with shielding in accordance with embodiments of the present invention.

In accordance with further embodiments of the present invention and, with reference to FIG. 12, shielding 1201 can be provided between the FETs 110. The shielding 1201 can include tungsten (W) or another similar material and can be fashioned in an FET-type configuration that aligns with the sources 111, the drains 112 and the nanowires 113 of the FETs 110. In any case, the shielding 1201 can prevent the heating of the target FET 130 from heating the neighboring FETs 140 and can thus allow the neighboring FETs 140 to be placed closer to the target FET 130 (i.e., from a spacing of 150 nm to 50 nm).

Figure 13:
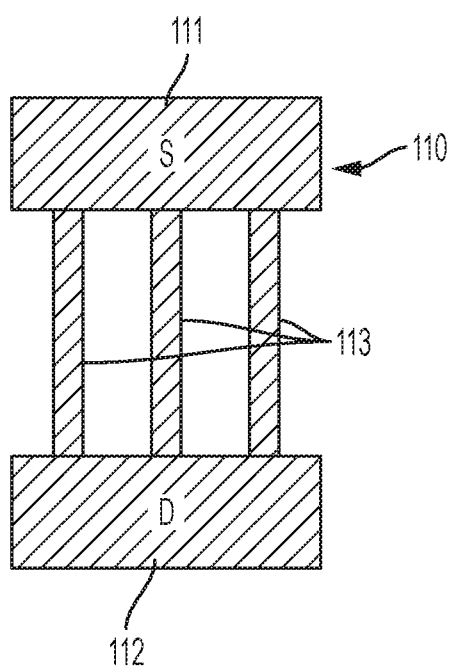
FIG. 13 is a top down view of FETs with multiple nanowires in accordance with embodiments of the present invention.
Figure 14:
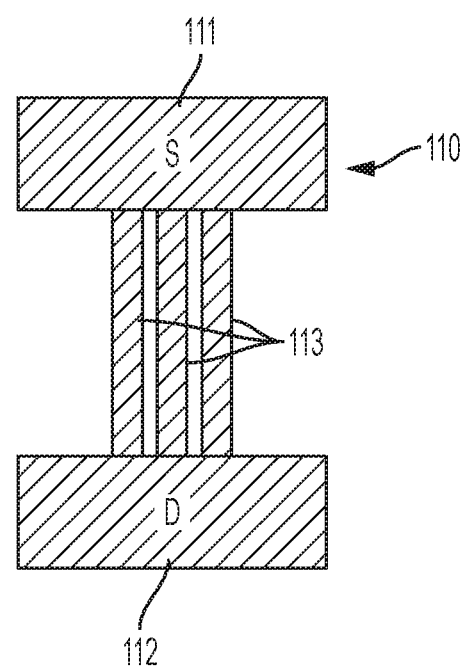
FIG. 14 is a top down view of FETs with multiple nanowires in accordance with embodiments of the present invention.

With reference to FIGS. 13 and 14, each FET 110 may include multiple nanowires 113 extending between the source 111 and the drain 112. As shown in FIGS. 13 and 14, the assembling can be executed such that a pitch between the multiple nanowires 113 is variable between a relatively wide pitch (see FIG. 13) and a relatively narrow pitch (see FIG. 14). In either case, the varying pitch can be employed to modulate surface temperatures during the disassembly heating processes described herein.

With reference to FIGS. 15A and 15B and FIGS. 16A and 16B, a structure 1501 is provided for sensing a molecule in a solution. The structure 1501 includes a transducer 1510, a sensing surface 1520, a circuitry 1530 and a container 1540. The transducer 1510 can be provided as a bi-polar junction transistor (BJT) or as an FET and includes a base/gate 1511 interposed between an emitter/source 1512 and a collector/drain 1513. The sensing surface 1520 can be one or more nanowires 113 with the first molecule 301 self-assembled thereon as described above and as illustrated schematically in FIG. 3. The circuitry 1530 is electrically coupled with the base/gate 1511 of the transducer 1510 and is configured to heat the sensing surface 1520. The container 1540 can be at least partially filled with first and second solutions. The sensing surface 1520 is immersible in either of the first and second solutions within the container 1540. The circuitry 1530 includes a first electrode 1531, which is electrically coupled to the emitter/source 1512, a second electrode 1532, which is electrically coupled to the collector/drain 1513, and a third electrode 1533. The third electrode 1533 is electrically disposable in the first and second solutions within the container 1540.

Figure 15B:
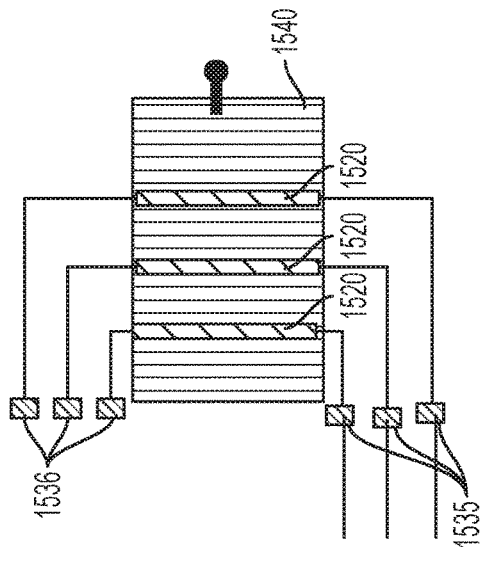
FIG. 15B is a top-down schematic diagram of a portion of the structure of FIG. 15A.
Figure 15A:
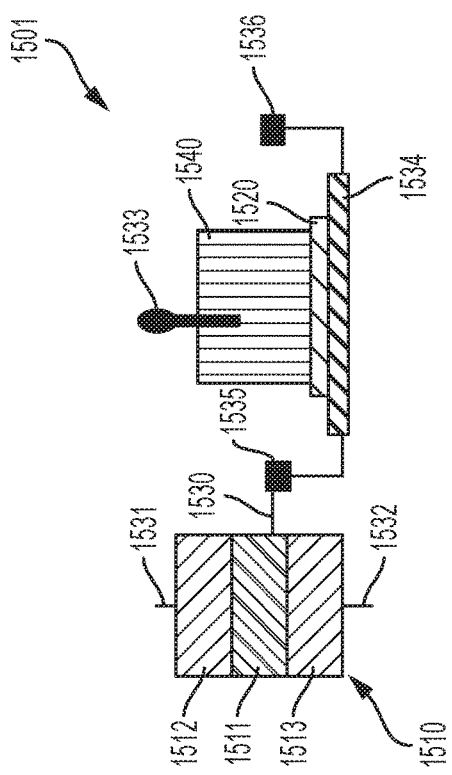
FIG. 15A is a schematic diagram of a structure for sensing molecules in a solution in accordance with embodiments of the present invention.

In accordance with embodiments of the present invention and as shown in FIGS. 15A and 15B, the circuitry 1530 further includes a heating element 1534 on which the sensing surface 1520 is disposable, a first pad 1535 and a second pad 1536. The first pad 1535 is electrically interposed between the base/gate 1511 and the second pad 1536 is disposed such that the heating element 1534 is serially interposed between the first and second pads 1535 and 1536.

In this case, during an operation of the structure 1501, with the sensing surface 1520 immersed in the first solution within the container 1540, a heating of the sensing surface 1520 can be accomplished by the circuitry 1530 whereby a voltage is applied between the first and second pads 1535 and 1536. Such heating can be sufficient to disassemble the first molecules from the sensing surface 1520 as described above. Then, with the sensing surface 1520 subsequently immersed in the second solution, second molecules can self-assemble onto the sensing surface 1520. In each case, the transducer 1510 and the circuitry 1530 can be further configured to cooperatively monitor molecular disassembly and self-assembly in the first and second solutions, respectively, with respect to the sensing surface 1520.

In an exemplary case, the monitoring of the molecular disassembly and self-assembly of the first and second molecules with respect to the sensing surface 1520 can be monitored, observed or sensed by observing how current changes in the collector drain 1513 using the first and second electrodes 1531 and 1532 relative to the first and second solutions within the container 1540 using the third electrode 1533.

Figure 16B:
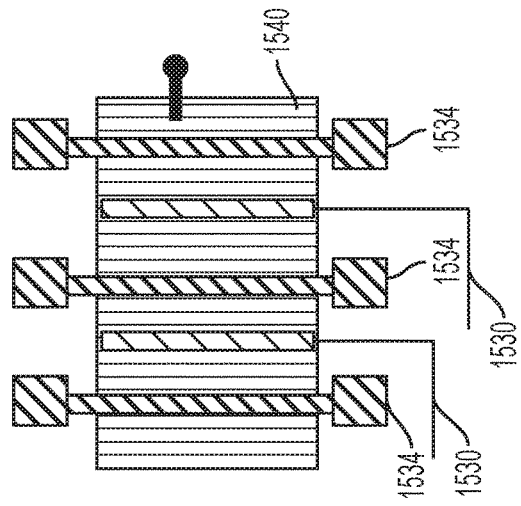
FIG. 16B is a top-down schematic diagram of a portion of the structure of FIG. 16A.
Figure 16A:
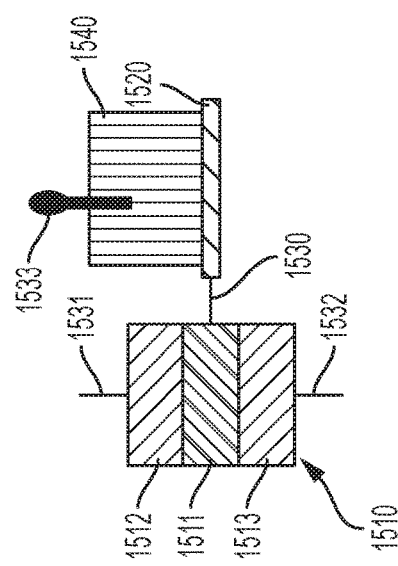
FIG. 16A is a schematic diagram of a structure for sensing molecules in a solution in accordance with embodiments of the present invention.

In accordance with embodiments of the present invention and as shown in FIGS. 16A and 16B, the sensing surface 1520 can be disposable proximate to one or more heating elements 1534 which can be spaced from one another by less than about 50 nm. Here, the base/gate 1511 can be directly electrically coupled to the sensing surface 1520.

In this case, during an operation of the structure 1501, with the sensing surface 1520 immersed in the first solution within the container 1540, a heating of the sensing surface 1520 can be accomplished by the circuitry 1530 to provide for joule heating of the sensing surface 1520 by the one or more heating elements 1534. Such heating can be sufficient to disassemble the first molecules from the sensing surface 1520 as described above. Then, with the sensing surface 1520 subsequently immersed in the second solution, second molecules can self-assemble onto the sensing surface 1520. In each case, the transducer 1510 and the circuitry 1530 can be further configured to cooperatively monitor molecular disassembly and self-assembly in the first and second solutions, respectively, with respect to the sensing surface 1520.

In an exemplary case, the monitoring of the molecular disassembly and self-assembly of the first and second molecules with respect to the sensing surface 1520 can be monitored, observed or sensed by observing how current changes in the collector drain 1513 using the first and second electrodes 1531 and 1532 relative to the first and second solutions within the container 1540 using the third electrode 1533.

Figure 17:
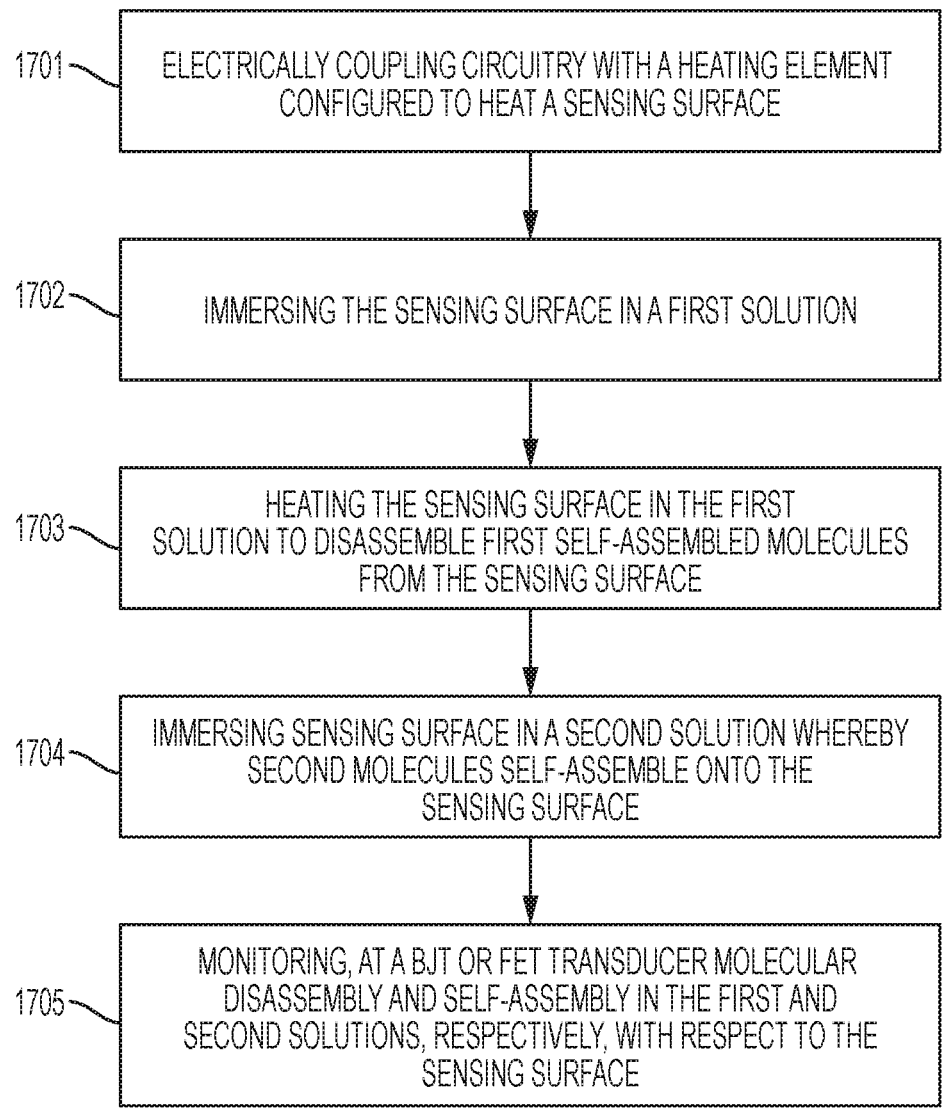
FIG. 17 is a flow diagram illustrating a method for sensing molecules in a solution in accordance with embodiments of the present invention.

With reference to FIG. 17, a method for sensing molecules in a solution is provided. As shown in FIG. 17, non-limiting embodiments of the method include electrically coupling circuitry configured to heat a sensing surface (1701), immersing the sensing surface in a first solution (1702) and heating the sensing surface by the circuitry in the first solution to disassemble first self-assembled molecules from the sensing surface (1703). The method can further include immersing the sensing surface in a second solution whereby second molecules self-assemble onto the sensing surface (1704). In addition, the method includes monitoring, at a BIT or an FET transducer and the circuitry, molecular disassembly and self-assembly in the first and second solutions, respectively, with respect to the sensing surface (1705).

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The term "conformal" (e.g., a conformal layer) means that the thickness of the layer is substantially the same on all surfaces, or that the thickness variation is less than 15% of the nominal thickness of the layer.

The terms "epitaxial growth and/or deposition" and "epitaxially formed and/or grown" mean the growth of a semiconductor material (crystalline material) on a deposition surface of another semiconductor material (crystalline material), in which the semiconductor material being grown (crystalline overlayer) has substantially the same crystalline characteristics as the semiconductor material of the deposition surface (seed material). In an epitaxial deposition process, the chemical reactants provided by the source gases can be controlled and the system parameters can be set so that the depositing atoms arrive at the deposition surface of the semiconductor substrate with sufficient energy to move about on the surface such that the depositing atoms orient themselves to the crystal arrangement of the atoms of the deposition surface. An epitaxially grown semiconductor material can have substantially the same crystalline characteristics as the deposition surface on which the epitaxially grown material is formed. For example, an epitaxially grown semiconductor material deposited on a {100} orientated crystalline surface can take on a {100} orientation. In some embodiments of the invention, epitaxial growth and/or deposition processes can be selective to forming on semiconductor surface, and cannot deposit material on exposed surfaces, such as silicon dioxide or silicon nitride surfaces.

As previously noted herein, for the sake of brevity, conventional techniques related to semiconductor device, integrated circuit (IC) fabrication and photodetector fabrication may or may not be described in detail herein. By way of background, however, a more general description of the semiconductor device, IC or photodetector fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device, an IC or a photodetector according to the present invention utilize a variety of individually known physical and chemical processes performed on a semiconductor (e.g., silicon), glass or plastic substrate, some of which are described in the immediately following paragraphs.

In general, the various processes used to form semiconductor-based devices (e.g., a photodetector) fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., polysilicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for sensing molecules in a solution, the method comprising:
    immersing a sensing surface in a first solution;
    heating the sensing surface in the first solution to disassemble first self-assembled molecules from the sensing surface;
    monitoring, at a bi-polar junction transistor (BJT) transducer, molecular disassembly of the first self-assembled molecules from the sensing surface in the first solution by the heating of the sensing surface;
    immersing the sensing surface in a second solution whereby second molecules self-assemble onto the sensing surface; and
    monitoring, at the bi-polar junction transistor (BJT) transducer, molecular self-assembly of the second molecules onto the sensing surface in the second solution.

2. The method according to claim 1, wherein:
    the BJT transducer comprises a base interposed between an emitter and a collector,
    a first electrode is electrically coupled to the emitter, a second electrode is electrically coupled to the collector and a third electrode is electrically disposable in the first and second solutions, and
    the monitoring of the molecular disassembly and self-assembly comprises observing current changes in a drain of the collector using the first and second electrodes relative to the first and second solutions using the third electrode.

3. The method according to claim 1 further comprising disposing the sensing surface on a heating element.

4. The method according to claim 1 further comprising disposing the sensing surface proximate to a heating element.

5. The method according to claim 1, wherein the monitoring of the molecular disassembly and self-assembly further comprises determining voltage changes in the BJT transducer and the first and second solutions.

* * * * *